United States Patent [19]

Krzesicki

[11] Patent Number: 4,739,542
[45] Date of Patent: Apr. 26, 1988

[54] SAFETY COUPLING CLAMP

[75] Inventor: Richard M. Krzesicki, Jackson, Mich.

[73] Assignee: Aeroquip Corporation, Jackson, Mich.

[21] Appl. No.: 12,437

[22] Filed: Feb. 9, 1987

[51] Int. Cl.$^4$ .............................................. B65D 63/02
[52] U.S. Cl. ........................................ 24/285; 24/279; 285/367; 285/411
[58] Field of Search ......................... 24/285, 280, 279; 285/367, 410, 411

[56] References Cited

U.S. PATENT DOCUMENTS

| | | | |
|---|---|---|---|
| 2,775,806 | 1/1957 | Love | 285/411 |
| 2,837,383 | 6/1958 | Skelly | 24/279 |
| 2,934,805 | 5/1960 | Zartler | 24/280 |
| 3,797,078 | 3/1974 | LaPointe | 285/367 |
| 3,797,079 | 3/1974 | Nixon | 24/285 |
| 4,568,115 | 2/1986 | Zimmerly | 24/285 |

FOREIGN PATENT DOCUMENTS 0638761  6/1950  United Kingdom ................ 285/411

OTHER PUBLICATIONS

Marman Products Company, Inc. of Los Angeles, California Drawing No. 24752 dated Jul. 5, 1956, "Coupling—3/16 T-Bolt Coded 40° V-Band Fail Safe".
Pressure Science Incorporated of Beltsville, Maryland Document No. S6154 dated Oct. 8, 1976, "Coupling, Clam Shell Style".

Primary Examiner—Victor N. Sakran
Attorney, Agent, or Firm—Beaman & Beaman

[57] ABSTRACT

A circumferentially contractible clamp operated by a bolt and nut actuator wherein a U-shaped safety saddle pivotally mounted upon one end of the clamp band includes a threaded bore receiving a threaded stem of the nut threaded upon the bolt. The inner end of the stem is operatively associated with the band other end wherein rotation of the nut tensions the bolt and the interconnection of the nut stem and the saddle supports the nut such that the stem will maintain the band in a contracted condition even if the bolt fails.

12 Claims, 1 Drawing Sheet

SAFETY COUPLING CLAMP

BACKGROUND OF THE INVENTION

Circumferentially contractible clamps are widely used to clamp conduits and the like. The clamps may be used to mount a hose upon an end fitting, position and clamp a patch upon a conduit, clamp the ends of aligned conduits in a sealed relationship, or used in similar applications. Such contractible clamps usually consist of a band or strap adapted to encircle the object or objects to be clamped, or the band may consist of a plurality of interconnected elements. The ends of the band are interconnected by an actuator capable of drawing the ends toward each other, and the actuator often takes the form of a bolt and nut device. In a contractible clamp using a bolt and nut actuator the bolt is usually pivotally mounted to one end of the band, while a nut mounted on the bolt bears against the other band end. As the nut is tightened on the bolt, the band ends are drawn together reducing the band diameter resulting in the desired band constriction.

While contractible band clamps and couplings using bolt and nut actuators are capable of producing effective clamping forces, the clamping forces necessary may require high tension forces within the bolt, and in the event of bolt fracture or thread failure the clamp will quickly open rendering the clamp ineffective, and possibly with serious results and extensive damage. Such clamps using bolt-type actuators are only as dependable as the strength of the bolt and nut components.

It is an object of the invention to provide a circumferentially ferentially contractible clamp having a bolt and nut type actuator, but utilizing structure which produces a safety feature wherein failure of the bolt will not cause the clamp to open or release, thereby providing a dependable safety backup.

Another object of the invention is to provide a circumferentially contractible clamp using a bolt and nut type actuator wherein a saddle is employed to support a member having a threaded bore receiving a portion of the nut for supporting the nut and the nut includes an abutment surface for engaging a band end as well as internal threads for imposing tension forces on the bolt wherein failure of the bolt permits the nut abutment end to maintain the contracted clamp condition.

Yet another object of the invention is to provide a circumferentially contractible clamp using a bolt and nut actuator having a dependable safety feature for preventing release of the clamp in the event of bolt failure and wherein the components may be easily manufactured and assembled upon the clamp.

In the practice of the invention the contractible band includes a first end having a pivot pin on which a threaded bolt is pivotally mounted. A U-shaped saddle is also pivotally mounted on the same pivot pin as the bolt and the saddle includes a base having a block affixed thereto in which a threaded bore is defined. The bolt extends through this threaded bore and the diameter of the saddle bore is considerably greater than that of the bolt.

A nut is threadedly mounted upon the free end of the bolt, and includes a head for receiving a wrench or other tool to permit nut rotation. The nut also includes an elongated tubular stem exteriorly threaded for mating with the threads of the saddle bore while the internal threaded bore of the nut cooperates with the bolt threads.

The innermost end of the nut stem abuts against a cradle slidably mounted upon the bolt, and the cradle is adapted to engage complementary surfaces formed on the other end of the band. The band other end is preferably formed as a yoke having spaced fingers between which the bolt extends.

The threads of the saddle bore and those of the bolt and nut are of equal pitch and rotation of the nut causes the stem end to engage the cradle which in turn abuts against the band end yoke. The nut produces the tension forces in the bolt and as the nut advances along the bolt the nut is also supported by the saddle. Rotation of the nut continues until the desired band constriction is achieved.

If the bolt should fracture due to the tension forces therein, or for other reasons, the band ends cannot separate because the end of the nut stem continues to engage the cradle and the position of the nut is maintained by the saddle which prevents the cradle from moving away from the band end upon which the bolt is pivoted. As the inner end of the nut stem always engages the cradle fracture of the bolt permits no displacement of the band yoke end relative to the bolt band end and an effective and dependable safety feature is provided, which is important if the band is used in high pressure installations, such as found in hydraulic fluid systems.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
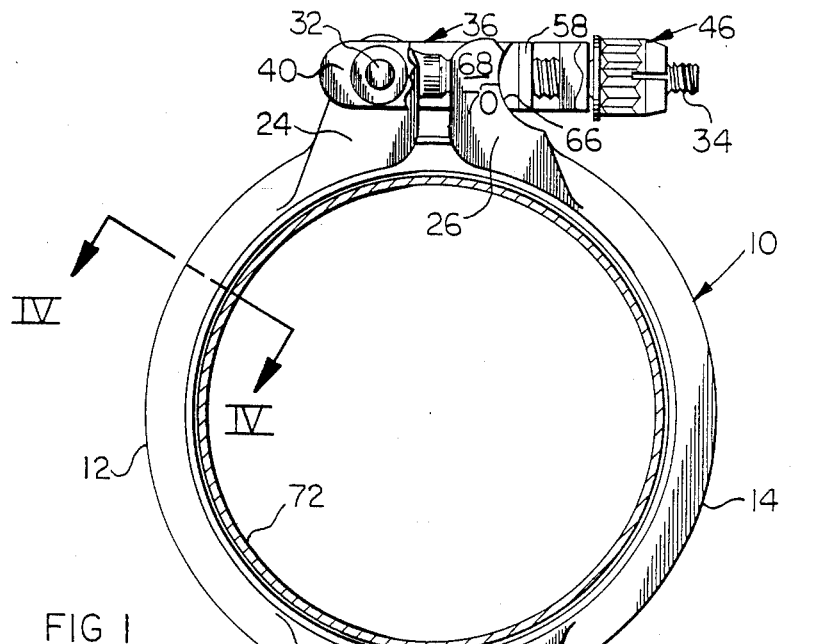
FIG. 1 is an elevational view of a circumferentially contractible clamp constructed in accord with the concepts of the invention, the clamp being shown in the closed condition, and a portion of the saddle leg being broken away for purpose of illustration.

A typical contractible clamp with which the concepts of the invention may be employed is shown in the drawings. The clamp includes a band or strap generally indicated at 10 which consists of a pair of segments 12 and 14 pivotally interconnected by a hinge link 16 and hinge pivots 18. The configuration of the band cross section may be of a V, as will be appreciated from FIG. 4, having flanges 20 and 22 and the band includes radially extending ends 24 and 26 to which the band constricting actuator apparatus is attached. The band 10 may consist of a single element or strap, rather than two pieces connected by a hinge, and it is also known to form contractible bands having more than two segments having hinge components extending between the adjacent segments. The actuator structure of the invention may be used with most contractible clamp constructions utilizing bolt and nut actuators.

The band end 24 is bifurcated to receive the head 28 of of bolt 30, and a pivot pin 32 extends through the bifurcated band end permitting the bolt 30 to be pivotally mounted upon the band end. The bolt 30 includes an elongated threaded shaft or rod portion 34, and the bolt configuration of the disclosed type is commonly used with contractible clamps.

A U-shaped saddle 36 is also pivotally mounted upon the pivot pin 32 and the saddle is formed of sheet material including a base 38 and a pair of spaced parallel legs 40 extending in a common direction from the base and located at the sides of the band end 24 having holes therein for receiving the pivot pin 32. Heading the pivot pin over permanently affixes the bolt 30 and saddle 36 to the band end 24 permitting these components to be pivoted relative to the associated band end.

The saddle 36 includes a block 42 mounted to the inside of the base 38 and the block includes a threaded bore 44 of a diameter greater than the diameter of the bolt portion 34 which extends through the bore 44.

Figure 3:
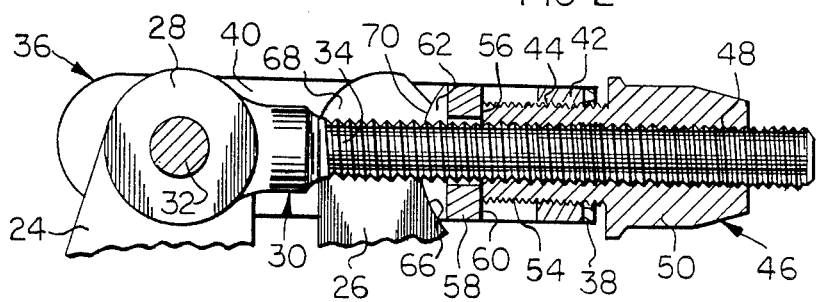
FIG. 3 is an elevational, sectional view taken through the actuator structure along Section III—III of FIG. 2.

A nut 46 is threaded upon the bolt portion 34 at the threaded bore 48 and includes an enlarged head 50 having wrenchengaging surfaces 52 defined thereon whereby a wrench may be applied to the head for rotating the nut to produce the band contraction forces. The nut 46 also includes an elongated stem 54 externally threaded so as to permit the nut to be threaded into the saddle block bore 44 as shown in FIG. 3. The thread of the nut internal bore 48 has a pitch identical to that of the threads of the stem 54 and bore 44.

The innermost end 56 of the stem 54 is flat and constitutes an abutment end for purposes later described.

A cradle 58 is slidably mounted upon the bolt portion 34 adjacent the nut stem 54. The cradle includes a flat base surface 60 for engagement with the stem end 56, and at its lateral regions the cradle includes a pair of extensions 62 each having an outer flat surface 64 disposed adjacent the inner surfaces of the saddle legs 40 which prevents rotation of the cradle on the bolt 30. The extensions 62 also include a convex circular segment surface 66 each having a center of generation lying in the plane which includes the axis of the bolt portion 34 and the axis of the pivot pin 32. As will be appreciated from FIG. 2, the bolt portion 34 extends between the cradle lateral extensions 62.

The band end 26 is in the form of a compression pad yoke having a pair of spaced fingers 68 between which the bolt portion 34 extends. The yoke fingers 68 are each provided with a concave circular segment surface 70 which corresponds to the radius of the cradle surfaces 66 and are engagable thereby during constriction of the clamp.

Figure 2:
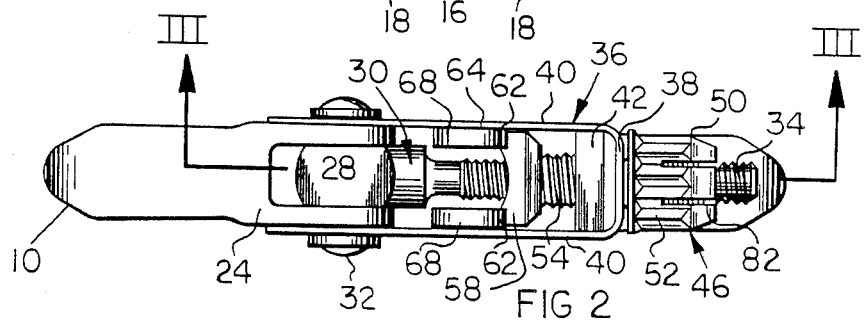
FIG. 2 is a top, plan view of the clamp of FIG. 1.
Figure 4:
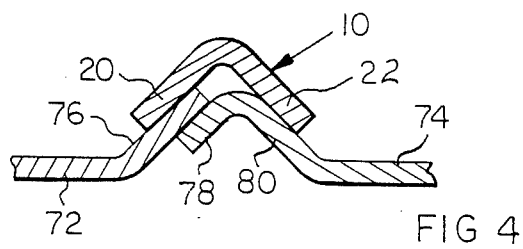
FIG. 4 is a sectional, detail view taken through the band along Section IV—IV of FIG. 1.

By way of example, the clamp of FIGS. 1-3 is used to maintain the assembly of tubular conduits 72 and 74, FIG. 4. The conduit 72 includes a single portion flare 76, while the conduit 74 includes a double portion flare having conical flares 78 and 80. Upon abutting the conduits 72 and 74 in end-to-end relationship, the flare end 76 engages the flare 78 as illustrated, and the band flange 20 engages the flare 76 while the band flange 22 engages the flare 80. Constriction of the band 10 upon the conduit ends produces both radial and axial forces on the conduit ends due to the oblique relationships of the band flanges and conduit flares producing a sealed relationship between the conduits.

To use the clamp of the invention, initially, the nut 46 will be "backed off" on the bolt 30 to the right, FIGS. 2 and 3, sufficiently to disengage and clear the cradle surfaces 66 from the yoke surfaces 70, and permit the bolt and saddle 36 to be pivoted counterclockwise, FIG. 3, so that the band end 26 is completely cleared and the band may be fully opened for permitting placement about the conduits 72 and 74.

Upon the clamp being located as desired upon the conduit ends, the band 10 is initially contracted by hand drawing the ends 24 and 26 toward each other. The bolt 30 and saddle 36 is then pivoted in a clockwise direction, FIG. 3, to place the bolt between the yoke fingers 68 as shown in FIG. 3. During this motion the cradle 58 will be maintained against the end 56 of the nut stem, or moved toward the saddle block 42, so as not to interfere with the swinging of the bolt and saddle over the band end 26.

Once the bolt and saddle is in the position of FIG. 3, the nut 46 is rotated by a wrench, not shown, or the like, and such action translates the nut along bolt portion 34 and threads the nut stem 54 into the saddle block bore 44. The stem end 56 engages the cradle surface 60 displacing the cradle toward the band end 26 permitting engagement of the arcuate surfaces 66 and 70.

Rotation of the nut 46 draws the band end 24 toward the end 26, and the length of the stem 54 is such that the nut 46 will produce the desired tension forces in the bolt 30 to produce the desired band constriction before head 50 engages the saddle base 38.

With the band 10 tightened as described above, should the bolt 30 fail, such as fracture, the clamp will not open as the abutting relationship between the nut stem 54 and cradle 58 will prevent separation of the band ends 24 and 26 due to the engagement of the nut within the saddle block bore 44. The tension forces previously existing in the bolt 30 are now transferred to the saddle legs 40, but no perceptible "opening" of the clamp occurs even if the bolt completely fractures. Thus, the aforedescribed structure and the use of the saddle 36 provides an automatic safety feature preventing inadvertent clamp release.

Opening of the clamp is accomplished by merely rotating the nut 46 in a counterclockwise direction translating the nut toward the right upon the bolt portion 34, FIG. 3, and such movement of the nut will permit the cradle surfaces 66 to disengage from the yoke surfaces 70 permitting the bolt and saddle to be swung in a counterclockwise direction for opening the clamp as described above. Even in the event of bolt fracture, rotation of the nut in a counterclockwise direction moves the nut to the right, permitting the cradle 58 to move to the right to separate surfaces 66 and 70.

Preferably, the nut head 50 is provided with slots 82 20. so that the configuration of the nut head may be slightly deformed to a normal elliptical configuration which will produce a friction self-locking action of the nut upon the bolt.

It will therefore be understood that the purpose of the saddle 36 and the threading of the nut stem into bore 44 is to maintain the position of the nut 46 relative to the band ends 24 and 26 even if the bolt 30 fails and that the equal pitch of the threads of bores 44 and 48 functions to automatically position the nut 46 on the saddle 36 as the nut tensions the bolt.

It will be appreciated that the apparatus of the invention accomplishes the desired purposes permitting a dependable safety feature to be utilized with contractible clamps having bolt and nut type actuators, and it is understood that various modifications to the inventive concepts may be apparent to those skilled in the art without departing from the spirit and scope of the invention.

I claim:

1. A circumferentially contractible clamp comprising, in combination, a band adapted to encircle the object to be clamped, first and second ends defined upon said band, a pivot defined on said band first end, first tension transmitting means comprising a threaded shaft mounted on said pivot, a compression pad defined on said band second end, said shaft being located adjacent said pad during clamping, a nut threaded upon said threaded shaft adapted to be operatively associated with said compression pad to tension said threaded shaft and contract said band, and second tension transmitting means connecting said nut to said band first end maintaining the spacing between said nut and said band first end as determined by the axial movement of said nut along said shaft during nut rotation to maintain the relative position of said first and second ends in the event of shaft failure.

2. A circumferentially contractible clamp comprising, in combination, a band adapted to encircle the object to be clamped, first and second ends defined upon said band, a pivot defined on said band first end, a threaded shaft mounted on said pivot, a compression pad defined on said band second end, said shaft being located adjacent said pad during clamping, a saddle mounted upon said first end extending adjacent said shaft during clamping and having a threaded bore, a nut having a head, a threaded bore, an elongated exteriorly threaded stem and an abutment end adjacent said stem, said nut stem being threaded into said saddle bore, said shaft being threaded into said nut bore, said stem abutment end being operatively associated with said band second end whereby rotation of said nut tensions said shaft to contract said band and maintains the relative position of said first and second ends in the event of shaft failure.

3. In a contractible clamp as in claim 2, said compression pad comprising a yoke having a pair of spaced fingers, said threaded shaft extending through said fingers.

4. In a contractible clamp as in claim 2, a cradle slidably mounted on said threaded shaft interposed between said nut stem abutment end and said band second end.

5. In a contractible clamp as in claim 4, a concave circular surface defined upon said band second end, and a convex circular surface defined on said cradle engaging said concave surface.

6. In a contractible clamp as in claim 2, said saddle comprising a U-shaped member having a base and legs depending from said base in a common direction therefrom, the free ends of said legs being pivotally attached to said pivot.

7. In a contractible clamp as in claim 6, said saddle threaded bore being formed in said saddle base.

8. A circumferentially contractible clamp comprising, in combination, a band adapted to encircle the object to be clamped, first and second ends defined upon said band, a pivot pin mounted upon said first end, a threaded bolt pivotally mounted upon said pivot pin, a saddle pivotally mounted on said pivot pin having a threaded bore spaced from said pivot pin, a nut having an outer end having a head, an elongated exteriorly threaded stem having an inner end and a threaded bore, said nut stem being threaded into said saddle bore and said bolt being threaded into said nut bore, said stem inner end extending toward said band second end and adapted to be operatively associated with said band second end whereby rotation of said nut tensions said bolt to contract said band and maintains the relative position of said first and second ends in event of bolt failure.

9. In a contractible clamp as in claim 8, the threads within said saddle bore and the exterior of said stem being of the same pitch as the threads of said stem bore and said bolt.

10. In a contractible clamp as in claim 9, a yoke defined on said band having a pair of spaced fingers, said bolt extending between said fingers.

11. In a contractible clamp as in claim 10, a cradle slidably mounted on said bolt adjacent said stem inner end and engaged thereby, and cradle engaging means defined on said yoke fingers for engagement with said cradle.

12. In a contractible clamp as in claim 11 wherein said cradle engaging means comprise a concave circular segment surface defined on each of said fingers, and complementary convex circular segment surfaces defined on said cradle for engagement with said concave surfaces.

* * * * *